Patented Feb. 14, 1939

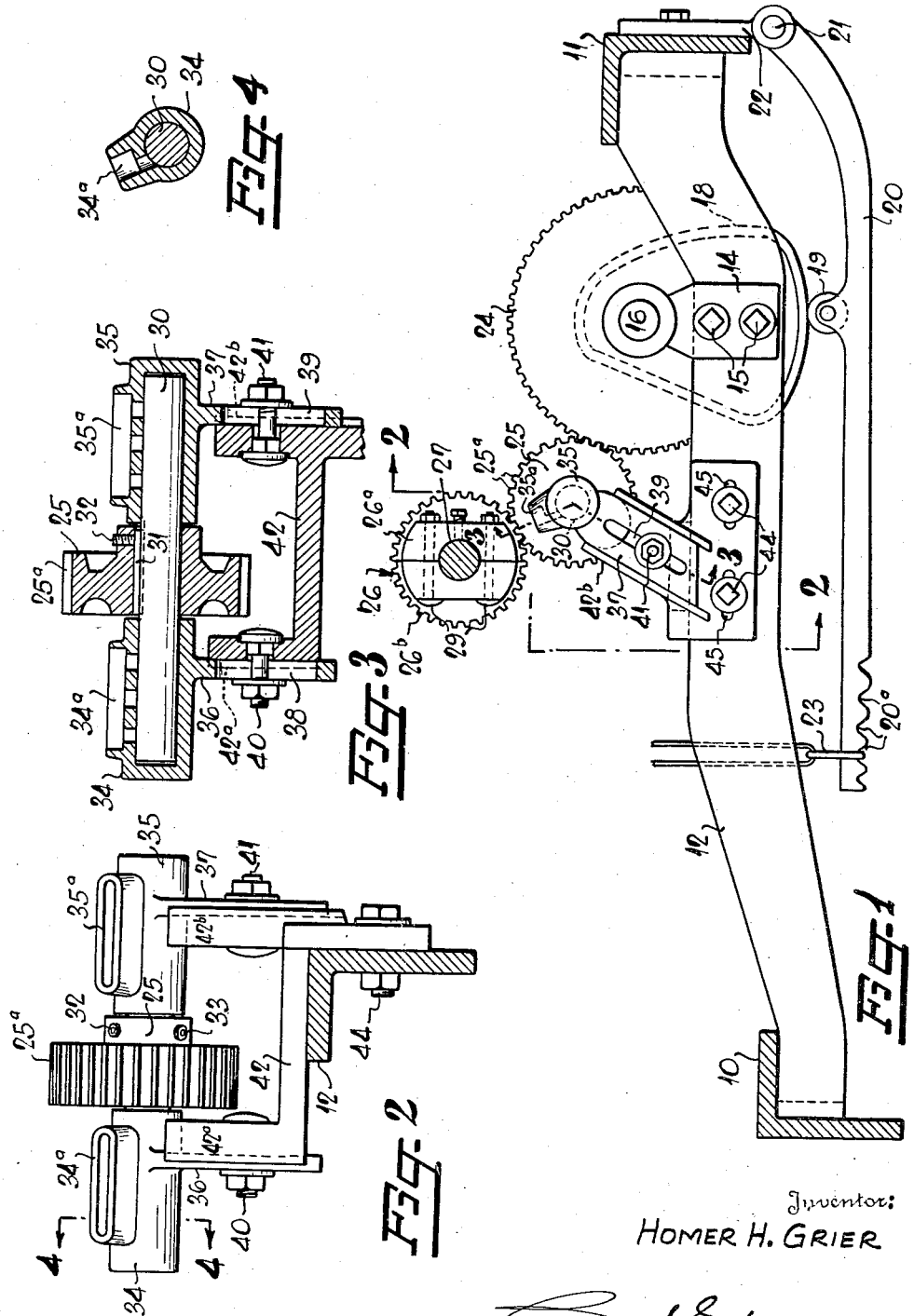

2,147,027

UNITED STATES PATENT OFFICE 2,147,027

IDLER GEAR MECHANISM FOR LOOMS

Homer H. Grier, New Holland, Ga.

Application March 28, 1938, Serial No. 198,357

6 Claims. (Cl. 74—397)

This invention relates to an idler gear for looms in which the gear is lubricated by the lubricant supplied to the shaft upon which it is mounted. More specifically it relates to an idler gear which is adapted to be placed between the auxiliary cam shaft gear and the timing gear on the loom. Heretofore, there has been no arrangement for oiling the stud or gears at this point; consequently when a loom thus equipped has run for some time the teeth in the idler gear, the cam shaft gear and the timing gear, become worn, resulting in a poor operation of the loom, which in turn, results in kinky filling, shuttles being diverted from their path, rough cloth with poor cover and the like. By providing this connecting gear between the auxiliary cam shaft gear and the timing gear, a condition of exact timing can be maintained over a long period of time, since the bearings which support the ends of the stud upon which the gear is mounted will also supply lubricant to the teeth of the gear.

It is, therefore, an object of this invention to provide an idler gear between the auxiliary cam shaft gear and the timing gear on a loom, said gear being mounted upon the intermediate portion of a stud shaft, and between two bearings which bearings are closed at their outer ends, with means for supplying oil to the ends of said shaft through the bearings. By providing such a structure, the oil supplied to the bearings will first lubricate the ends of the shaft, and due to the closed ends of the bearings, the oil will be forced to escape from around the shaft and flow upon the teeth of the gear disposed therebetween.

It is another object of this invention to provide an intermediate gear of the class described, which is adjustably mounted relative to the auxiliary cam shaft gear and the timing gear on a loom so that this gear may be readily adjusted to suit the different sizes of loom timing gears that are required for different weaves. The ultimate result of such an idler gear is to create a better and more positive method of timing the loom, as well as a longer life and greater durability of the parts.

It is a further object of the invention to provide supporting means for an idler gear disposed between two other gears whereby the idler gear shaft is adjustably mounted in self-alining bearings which confine the lubricant and allow no escape of the lubricant except by dripping or flowing on the gear carried by the idler shaft.

Some of the objects of the invention having been stated, other objects will appear as the description proceeds when taken in connection with the accompanying drawing, in which:—

Figure 1 is a cross-sectional view through the lower portion of a loom showing the invention disposed between the timing gear and the auxiliary cam shaft gear;

Figure 2 is a vertical sectional view taken along the line 2—2 in Figure 1;

Figure 3 is a substantially vertical sectional view taken along the line 3—3 in Figure 1;

Figure 4 is a vertical sectional view taken along the line 4—4 in Figure 2;

Referring more specifically to the drawing, the numerals 10 and 11 denote conventional longitudinal struts, forming a part of the framework of a loom and which are disposed in the lower portion of the loom a few inches above the floor line. Between these struts is a cross girt 12 upon which is secured a bearing 14 by any suitable means such as bolts 15. In the upper end of this bearing is rotatably mounted one end of auxiliary cam shaft 16. The other end of this cam shaft is supported by suitable girts and bearings similar to the ones just described, but since the parts are conventional, it is not deemed necessary to make this showing in the drawing.

The shaft 16 has a plurality of cams such as indicated by reference character 18 secured thereon, each of said cams being contacted by a roller 19 in treadle bar 20. The treadle bar 20 is pivoted as at 21 to bearing 22, which bearing is secured to the longitudinal strut 12. The left-hand end of the treadle 20 projects forwardly of the loom and has a plurality of notches 20a in the lower portion thereof, which are engaged by link 23, said link 23 projecting upwardly and being adapted to operate the harness of the loom. The parts thus far described are conventional, but it is deemed necessary to make this disclosure of old structure in order to properly illustrate the function that this invention performs in a loom.

Mounted on the auxiliary cam shaft 16 is a gear 24 which gear is adapted to mesh with idler gear 25 and the idler gear 25 also meshes with timing gear 26 which is disposed upon main cam shaft 27. The shaft 27 receives its power from the crank shaft of the loom, not shown, and as this shaft is rotated, it is evident that the timing gear 26 will cause the auxiliary cam shaft 16 and its associated cams to rotate. The timing gear 26 is inter-changeable and is usually constructed in two sections, such as 26a and 26b. These sections are secured together around the shaft 27 by means of suitable bolts 29. When a different weave is desired a different timing is necessary and therefore it will be necessary to change the timing gear 26 and substitute therefor a gear of a greater or smaller size. When this is done, the intermediate or idler gear 25 must be moved to a different position, since the shafts 27 and 16 rotate in stationary bearings.

It is very important that the intermediate gear 25 mesh properly with its associated gears 24 and 26. I have provided a special type of support for this gear which will enable the teeth of the gear to remain lubricated at all times from the lubrication supplied to the bearings of the shaft upon which the gear is mounted. The gear 25 is secured to a stud shaft 30 by any suitable means such as key 31 and set screws 32 and 33. The ends of shaft 30 are adapted to rotate in bearings 34 and 35, which bearings have downstanding legs 36 and 37, respectively, integral therewith. These legs have slots 38 and 39 therein which are penetrated by bolts 40 and 41, respectively, said bolts also penetrating uprights 42a and 42b of bracket 42. The bracket 42 is secured to girt 12 by any suitable means such as bolts 44, each bolt 44 penetrating a slot 45 in the lower portion of the bracket 42 and also penetrating the girt 12. It should be noted that the legs 36 and 37 are adapted to slide between the flange uprights 42a and 42b. The legs 36 and 37 will be held between the flanges of these uprights and the bolts 40 and 41 can be screwed home to hold the legs in position when they have once been adjusted. Also by providing the slots 45 in the lower portion of the bracket 42, it is possible to obtain lateral adjustment of the bracket 42 and its associated parts relative to the loom. For example, suppose that it is desired to remove the timing gear 26 and substitute a much larger gear, in its stead. Before this larger gear is installed, it is necessary to place the gear 25 in a much lower position than it now occupies in Figure 1 so that it will mesh with the replaced larger gear and the gear 24. This readjustment can be effected merely by loosening the bolts 40 and 41 and thereby allowing the bearings 34 and 35 to be lowered to the proper position. Then if the bracket does not occupy the desired position so as to mesh properly, the bolts 44 can be loosened to allow the bracket to be moved bodily to the right or to the left, as the case might be, in Figure 1.

The upper portion of the bearings 34 and 35, have lubrication cups 34a and 35a on the upper side thereof, in which lubricant is supplied for oiling the ends of shaft 30. The ends of the bearings 34 and 35 against which the ends of the shaft 30 abut are closed; consequently, the oil, after it has lubricated the ends of shaft 30, must escape from these bearings through the open ends. Since the proximate faces of the bearings 34 and 35 are open and also abut the opposed faces of gear 25, it is evident that the oil, as it escapes from these bearings, will flow downwardly from these opposed faces and ultimately find its way to the teeth 25a, and supply the proper lubrication thereto. It will also be noted that the oil cups 34a and 35a are inclined toward the front of the loom, that is, toward the longitudinal strut 10 so that an attendant may easily oil the cup from the weaver's alley, which alley is disposed parallel and adjacent to the strut 10.

It is, therefore, seen that I have provided an idler gear for looms which is capable of using the same oil for oiling the bearings upon which the gear is mounted, for also oiling the teeth on the gear. I have also provided an idler gear which is capable of being adjusted to any desired position relative to its adjoining gears so as to allow different sizes of timing gears to be used for different weaves.

It is also evident that my idler gear may be employed in connection with any two shafts where a self-lubricating and self-alining idler gear is desired.

In the drawing and specification, there has been set forth a preferred embodiment of the invention, and although specific terms are employed, they are used in a generic and descriptive sense only, and not for purposes of limitation, the scope of the invention being set forth in the appended claims.

I claim:

1. In a loom having a frame and an auxiliary cam shaft and a main cam shaft, a gear disposed on each shaft, an idler gear disposed between the first two gears, means for supporting the idler gear for rotation comprising a shaft on which the idler gear is fixedly mounted, a bearing member for each end of the idler gear shaft, means individual to each bearing member for adjusting the same in a plane at right angles to the longitudinal axis of the shaft, each bearing being closed at its outer end and having an oil cup on its upper side whereby lubricant applied to the ends of the shaft will flow onto the idler gear and will be prevented from flowing in any other direction.

2. In a loom having a main cam shaft and an auxiliary cam shaft and a gear on each of the shafts and an idler gear meshing with the said other gears, means for mounting the idler gear comprising a stud shaft, means securing the idler gear on the stud shaft, a bracket secured to the loom frame and having a pair of separate bearing members mounted thereon for supporting the ends of the stud shaft, each of said bearings being separately adjustable with relation to the bracket and each bearing being closed at its outer end, and means permitting lubricant to be introduced into said bearings.

3. In a loom having a pair of shafts, each provided with a gear, a stud shaft, an idler gear fixed on said stud shaft intermediate the ends of the stud shaft and meshing with the gears on said pair of shafts, a pair of bearing members completely surrounding and enclosing the outer ends of the stud shaft and having their proximate ends disposed in wiping contact with the idler gear, the upper portions of said bearing members having holes therein for the introduction of a lubricant to lubricate the ends of the stud shaft and whereby excess lubricant will be wiped from the proximate ends of the bearings by the rotating idler gear to lubricate the idler gear and the gears on the pair of shafts, a bracket, and means for individually and adjustably mounting each bearing on its bracket.

4. In a loom having a pair of alined shafts each provided with alined gears, an idler gear disposed between and meshing with said gears, means for supporting the idler gear comprising a stud shaft having the idler gear fixed thereon intermediate the ends of the stud shaft, a pair of bearing members closed at their outer ends and receiving the ends of said stud shaft, means permitting lubricant to be introduced into said bearings to lubricate the ends of the stud shaft and to be wiped by the rotating idler gear to lubricate the idler gear and the other gears meshing therewith, a bracket supporting the bearings and a bolt and slot connection between the bracket and each bearing for adjusting the position of each bearing with relation to the bracket.

5. An idler gear mechanism for looms comprising a bracket, means for adjustably securing the bracket to the frame of the loom, a pair of spaced parallel upright arms extending from said bracket and each having a groove therein, a bolt penetrating each arm, a pair of bearing members each having a slotted leg disposed in the groove in each of said arms, said groove being penetrated by one of said bolts, said bearing members being open at their proximate ends, a stud shaft mounted for rotation in said bearing members, an idler gear fixed on an intermediate portion of said stud shaft, and means permitting introduction of a lubricant into said bearings to lubricate the bearings and the ends of the stud shaft and permitting wiping contact between the idler gear and the proximate ends of said bearings to also lubricate the idler gear.

6. An idler gear mechanism comprising a bracket, a pair of spaced parallel upright arms extending from said bracket and each having a groove therein, a bolt penetrating each arm, a pair of bearing members each having a slotted leg disposed in the groove in each of said arms, said groove being penetrated by one of said bolts, said bearing members being open at their proximate ends, a stud shaft mounted for rotation in said bearing members, an idler gear fixed on an intermediate portion of said stud shaft, and means permitting introduction of a lubricant into said bearings to lubricate the bearings and the ends of the stud shaft and permitting wiping contact between the idler gear and the proximate ends of said bearings to also lubricate the idler gear.

HOMER H. GRIER.